UNITED STATES PATENT OFFICE.

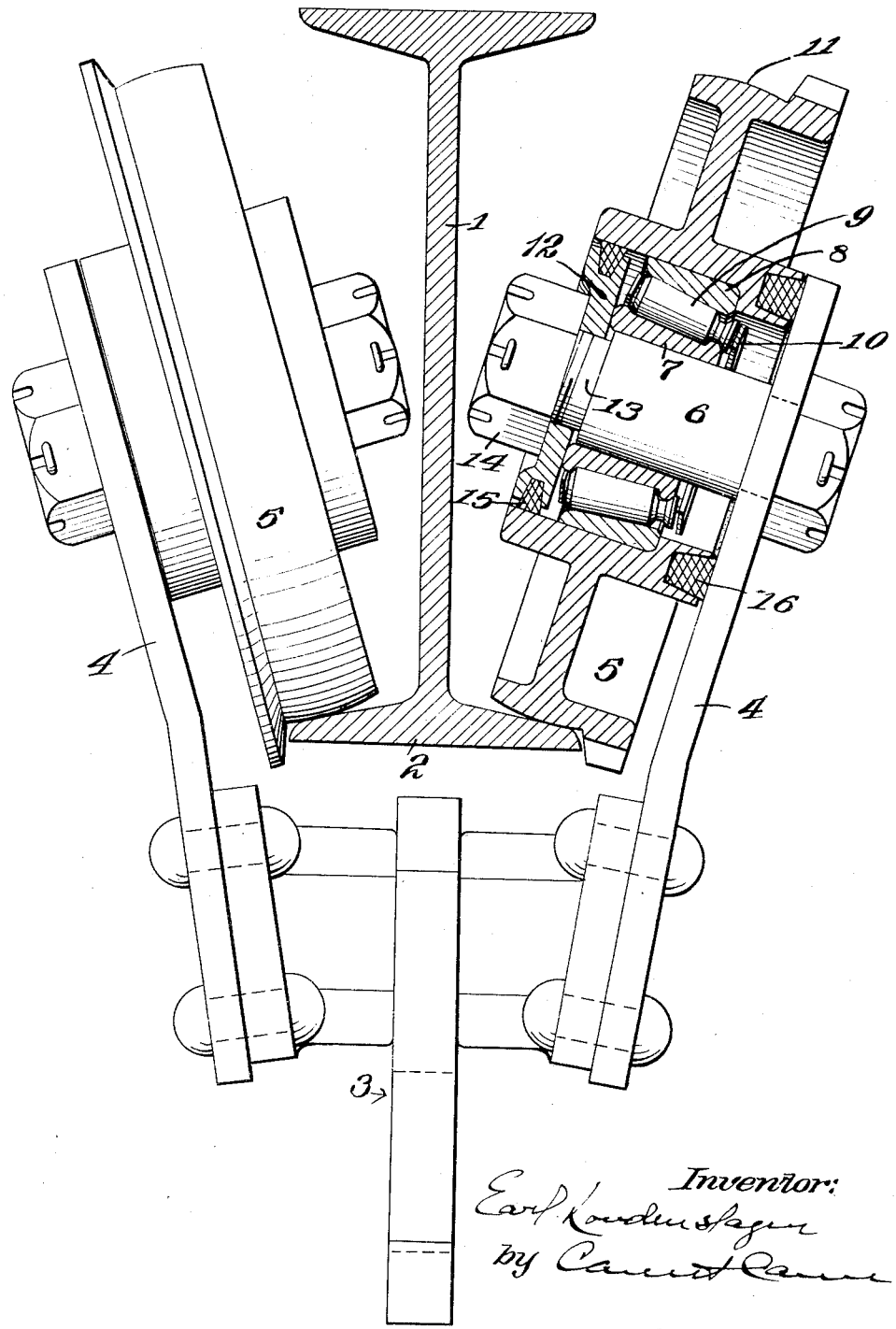

EARL LOUDENSLAGER, OF CANTON, OHIO, ASSIGNOR TO THE TIMKEN ROLLER BEARING COMPANY, OF CANTON, OHIO, A CORPORATION OF OHIO.

TROLLEY-WHEEL BEARING.

1,367,706.   Specification of Letters Patent.   Patented Feb. 8, 1921.

Application filed February 11, 1920. Serial No. 357,884.

*To all whom it may concern:*

Be it known that I, EARL LOUDENSLAGER, a citizen of the United States, and a resident of the city of Canton, in the county of Stark and State of Ohio, have invented a new and useful Improvement in Trolley-Wheel Bearings, of which the following is a specification.

My invention relates to trolley wheels. The principal object of the invention is to devise an antifriction bearing for trolley wheels intended to run on the lower flanges of ordinary I-beam trackways. Other objects are to provide a bearing that will keep properly seated and that will minimize the tendency of the trolley wheel to wabble.

The invention consists principally in so disposing the bearing that the load borne by said bearing sets up a thrust endwise of the bearing which tends to keep the bearing members in position. The invention also consists in a trolley wheel construction in which the plane of the tread of the trolley wheel on the trackway is about midway of the bearing so as to minimize wabbling of the trolley wheel. The invention further consists in the parts and combinations of parts hereinafter described and claimed.

The drawing, which forms a part of this specification, is an elevation of a trolley wheel construction embodying my invention, certain parts being shown in section.

The construction illustrated in the accompanying drawing comprises a trackway and a wheeled trolley that moves thereon. The trackway is preferably an overhead commercial I-beam 1 whose lower flanges 2 have their upper surfaces sloping outwardly and downwardly. The trolley comprises a frame 3, from which a receptacle or carrier is supended, and which comprises two arms 4 that diverge upwardly on opposite sides of the I-beam and support the trolley wheels 5 that run on the upper inclined surfaces of the lower flanges 2 of the I-beam 1. The trolley wheels are mounted on spindles 6 which are secured to said arms 4 and which are inclined upwardly toward said I-beam 1. An antifriction bearing, preferably a conical roller bearing, is interposed between each spindle and its trolley wheel, said conical roller bearing comprises a cone or inner bearing member 7 fixed on said spindle 6, a cup or outer bearing member 8 fixed in the hub portion of the trolley wheel to rotate therewith, conical rollers 9 between said bearing members and a cage 10 adapted to retain said rollers in position. The rim 11 or tread of the wheel is transversely curved and a comparatively small middle portion thereof contacts with the downwardly inclined flange of the I-beam.

A cover plate 12 or dust cap has a central opening therein whereby it is mounted on the reduced inner end portion 13 of the spindle 6. The end of the spindle 6 is threaded to receive a nut 14 which holds the cover plate 12 in position. Said cover plate is arranged to bear against the end of the inner bearing member 7 to serve as a positioning means therefor. A suitable packing 15 is arranged between said cover plate 12 and the hub portion of the trolley wheel to keep dirt out of the trolley wheel. A packing 16 is likewise arranged between the arms and the trolley wheel.

As stated above, the spindles upon which the trolley wheels are mounted are inclined upwardly toward the web of the I-beam trackway. The inclination is preferably slightly greater than the angle between the axis of the bearing cup and the inner surface thereof; as, with this relation, there is a tendency for the radial load to develop a component acting endwise as a thrust tending to keep the bearing members properly seated. Likewise, the plane of the tread of each trolley wheel is so located that it passes through or close to the longitudinal middle portion thereof, so as thereby to reduce to a minimum the tendency of the wheels to wabble along the trackway.

It is an important advantage of my invention that it requires only a single series of rollers for each trolley wheel, whereas previous devices have required two such series. Further, my invention provides a trolley wheel construction that is strong, durable and simple in construction and in which wabbling of the trolley wheels and displacement and wear of the bearings are minimized.

It is obvious that changes may be made without departing from my invention and I do not wish to be limited to the precise construction shown.

What I claim is:

1. A trolley construction comprising a trackway, a trolley frame, inclined spindles thereon, trolley wheels on said spindles and a conical roller bearing interposed between each spindle and its trolley wheel, the angle of inclination of said spindles being greater than the angle between the axis of the outer bearing member of said conical roller bearing and the inner surface thereof.

2. A trolley construction comprising a trackway, inclined spindles, trolley wheels thereon, and a conical roller bearing for each spindle and trolley wheel, said roller bearing comprising a conical inner bearing member, a conical outer bearing member, conical rollers between said bearing members and a cage for said rollers, the angle of inclination of said spindles being greater than the angle between the axis of said outer bearing member and the inner surface thereof.

3. A trolley construction comprising an I-beam, inclined spindles, a trolley wheel on each spindle, said trolley wheel having a transversely curved tread portion adapted to bear on the flange of the I-beam close to the plane of the longitudinal middle portion of the trolley wheel, and a conical roller bearing interposed between each spindle and trolley wheel.

4. A trolley construction comprising an I-beam, spindles inclined upwardly toward said I-beam, trolley wheels on said spindles arranged to bear on the flanges of said I-beam, said trolley wheels having transversely curved tread portions arranged to bear on the flange of the I-beam, close to the planes of the longitudinal middle portions of the respective wheels, and a conical roller bearing for each trolley wheel arranged on each of said spindles.

5. A trolley construction comprising an I-beam, spindles inclined upwardly toward said I-beam, trolley wheels on said spindles arranged to bear on the flanges of said I-beam, said trolley wheels having transversely curved tread portions adapted to bear on the flange of the I-beam at a point close to the longitudinal middle planes of the wheels, and a conical roller bearing for each trolley wheel arranged on each of said spindles, the angle of inclination of the axis of each outer bearing member of said roller bearings being greater than the angle between said axis and the inner or bearing surface of said outer bearing member.

Signed at Canton, Ohio, this 6th day of February, 1920.

EARL LOUDENSLAGER.